US011514311B2

(12) United States Patent
Brill et al.

(10) Patent No.: US 11,514,311 B2
(45) Date of Patent: Nov. 29, 2022

(54) AUTOMATED DATA SLICING BASED ON AN ARTIFICIAL NEURAL NETWORK

(71) Applicant: International Business Machines Corporation, Armonk, NY (US)

(72) Inventors: Rachel Brill, Haifa (IL); Eitan Farchi, Pardes-Hana (IL); Orna Raz, Haifa (IL); Aviad Zlotnick, Mitzpeh-Netofa (IL)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 16/502,073

(22) Filed: Jul. 3, 2019

(65) Prior Publication Data

US 2021/0004671 A1    Jan. 7, 2021

(51) Int. Cl.
  *G06N 3/08* (2006.01)
  *G06K 9/62* (2022.01)
  *G06N 20/10* (2019.01)
  *G06N 3/02* (2006.01)

(52) U.S. Cl.
  CPC ............ *G06N 3/08* (2013.01); *G06K 9/6227* (2013.01); *G06K 9/6262* (2013.01); *G06N 3/02* (2013.01); *G06N 20/10* (2019.01)

(58) Field of Classification Search
  CPC  G06N 3/08; G06N 3/02; G06N 20/10; G06N 5/003; G06N 20/20; G06N 3/0454; G06K 9/6227; G06K 9/6262
  See application file for complete search history.

(56) References Cited

U.S. PATENT DOCUMENTS

| | | | |
|---|---|---|---|
| 8,086,640 B2 | 12/2011 | Grichnik et al. | |
| 10,290,040 B1* | 5/2019 | Misra | G06F 16/9535 |
| 10,380,997 B1* | 8/2019 | Ward | G06N 3/08 |
| 2015/0379429 A1 | 12/2015 | Lee et al. | |
| 2016/0246838 A1 | 8/2016 | Li et al. | |
| 2018/0365229 A1 | 12/2018 | Buhrmann et al. | |
| 2019/0122096 A1* | 4/2019 | Husain | G06N 3/04 |
| 2019/0122119 A1* | 4/2019 | Husain | G06N 3/086 |
| 2020/0285939 A1* | 9/2020 | Baker | G06N 3/04 |
| 2021/0081761 A1* | 3/2021 | Baker | G06N 3/084 |

OTHER PUBLICATIONS

Speakman, S., et al., "Subset Scanning Over Neural Network Activations", arXiv:1810.08676v1 [cs.LG] Oct. 19, 2018.*

* cited by examiner

*Primary Examiner* — Xuemei G Chen
(74) *Attorney, Agent, or Firm* — Ziv Glazberg

(57) ABSTRACT

A method, apparatus and a computer program product for automated data slicing based on an Artificial Neural Network (ANN). The method comprising: obtaining an ANN, wherein the ANN is configured to provide a prediction for a data instance, wherein the ANN comprises a set of nodes having interconnections therebetween; determining an attribute vector based on a subset of the nodes of the ANN; determining, based on the attribute vector, a plurality of data slices; obtaining a testing dataset comprising testing data instances; computing, for each data slice, a performance measurement of the ANN over the data slice, wherein said computing is based on an application of the ANN on each testing data instance that is mapped to the data slice; and performing an action based on at least a portion of the performance measurements of the data slices.

20 Claims, 4 Drawing Sheets

AUTOMATED DATA SLICING BASED ON AN ARTIFICIAL NEURAL NETWORK

TECHNICAL FIELD

The present disclosure relates to validating Artificial Neural Networks (ANN) in general, and to performing data slicing to validate the ANN for different data sets, in particular.

BACKGROUND

The current paradigm in some Machine Learning (ML) use cases, especially in computer vision, is to let an Artificial Neural Network (ANN) learn the attributes, instead of having a human defining them. In some exemplary embodiments, a Deep Neural Network (DNN) may be an ANN with several layers. In some cases, the DNN has several layers that compute "hidden" features, and then several fully connected layers that combine the hidden features to yield a classification or a final score.

Different performance and accuracy metrics may be utilized to evaluate the performance of machine learning models, such as F1-score, accuracy or the like. Accuracy may be measures as the percentage of total items classified correctly. F1-Score is a harmonic mean of precision (e.g., the number of items correctly identified as positive out of total items identified as positive) and recall (e.g., the number of items correctly identified as positive out of total true positives).

BRIEF SUMMARY

One exemplary embodiment of the disclosed subject matter is a method comprising: obtaining an Artificial Neural Network (ANN). The ANN may be configured to provide a prediction for a data instance. The ANN may comprise a set of nodes having interconnections therebetween. The method further comprises determining an attribute vector based on a subset of the nodes of the ANN. The method further comprises determining, based on the attribute vector, a plurality of data slices. The method further comprises obtaining a testing dataset comprising testing data instances. The method further comprises computing, for each data slice, a performance measurement of the ANN over the data slice. Said computing may be based on an application of the ANN on each testing data instance that is mapped to the data slice. The method further comprises performing an action based on at least a portion of the performance measurements of the data slices.

Another exemplary embodiment of the disclosed subject matter is a computerized apparatus having a processor and coupled memory, the processor being adapted to perform the steps of: obtaining an Artificial Neural Network (ANN). The ANN may be configured to provide a prediction for a data instance. The ANN may comprise a set of nodes having interconnections therebetween. The method further comprises determining an attribute vector based on a subset of the nodes of the ANN. The method further comprises determining, based on the attribute vector, a plurality of data slices. The method further comprises obtaining a testing dataset comprising testing data instances. The method further comprises computing, for each data slice, a performance measurement of the ANN over the data slice. Said computing may be based on an application of the ANN on each testing data instance that is mapped to the data slice. The method further comprises performing an action based on at least a portion of the performance measurements of the data slices.

Yet another exemplary embodiment of the disclosed subject matter is a computer program product comprising a non-transitory computer readable storage medium retaining program instructions, which program instructions when read by a processor, cause the processor to perform a method comprising: obtaining an Artificial Neural Network (ANN). The ANN may be configured to provide a prediction for a data instance. The ANN may comprise a set of nodes having interconnections therebetween. The method further comprises determining an attribute vector based on a subset of the nodes of the ANN. The method further comprises determining, based on the attribute vector, a plurality of data slices. The method further comprises obtaining a testing dataset comprising testing data instances. The method further comprises computing, for each data slice, a performance measurement of the ANN over the data slice. Said computing may be based on an application of the ANN on each testing data instance that is mapped to the data slice. The method further comprises performing an action based on at least a portion of the performance measurements of the data slices.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
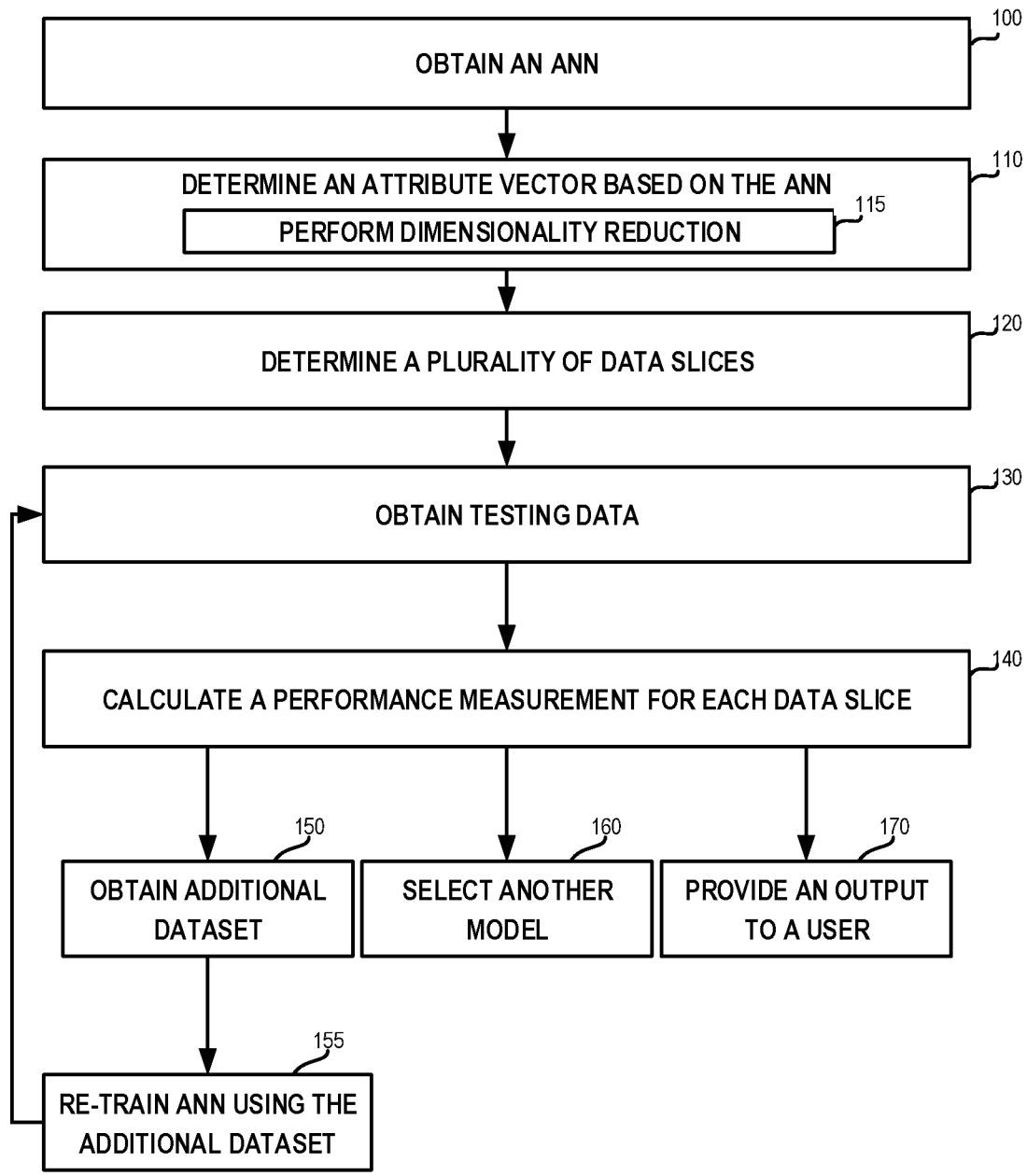
FIG. 1A shows a flowchart diagram of a method, in accordance with some exemplary embodiments of the disclosed subject matter.

One technical problem dealt with by the disclosed subject matter is to verify that a predictive model is valid. In some exemplary embodiments, a performance metric, such as F1-Score, Accuracy, or the like, may be utilized to measure the performance of the predictive model. The performance metric may be calculated over the entire training dataset of the predictive model, the entire testing dataset of the predictive model, or the like. However, there may be slices of a dataset on which the predictive model may perform below a threshold while performing above another threshold on other slices of the same dataset. Such below-par performance may be concealed in the overall performance metric due to the above-par performance in the other slices. As an example, there may be a slice in the dataset over which the performance of the predictive model may be below a threshold, such as below 85%, below 80%, or the like; while there may another slice in the dataset on which the predictive may perform above a threshold, such as above 95%, above 98%, or the like. However, using regular performance metrics, the predictive model may have an average performance over 90%, over 92%, or the like. Such a performance may be considered to be a good performance, even though the predictive model may not perform well over some data slices. Hence, it may be desired to offer a method to verify the performance of the model over slices of the data.

Another technical problem dealt with by the disclosed subject matter is to automatically create data slices. Instead of manual definition of data slices, it may be desired to have an automated manner to identify different slices in the instance space to evaluate each slide individually. It may be desired to offer a method that enables an automated mean for mapping data-instances to data slices based on the features.

One technical solution is to compute different performance measurements for the predictive model over different data slices. In some exemplary embodiments, data slices over the data of the predictive model may be automatically determined based on an attribute vector thereof. In some exemplary embodiments, the predictive model may be implemented using an ANN. The ANN may be trained based on a dataset that comprises data instances. The ANN may be configured to provide a prediction for a data instance. When the ANN is applied on a data instances, a label may be predicted. The dataset may comprise training data comprising data instances and labels thereof.

In some exemplary embodiments, an attribute vector may be determined based on a subset of the nodes of the ANN. In some exemplary embodiments, the attribute vector may comprise the nodes of a layer of the ANN. As an example, the layer may be a fully connected layer of the ANN. As another example, the layer may be the first fully connected layer of the ANN, the first non-convolutional layer appearing in the ANN, or the like. The attribute vector may be a feature vector having a dimension that is considerably smaller than the dimension of the feature vector representing the data instance. In some exemplary embodiments, based on the attributes vector, data slices of the data instances may be determined. The data slices may define subsets of data instances. In some exemplary embodiments, the data slice of an instance may be determined by computing the values of the attribute vector, which may be performed by feeding the instance into the ANN (or a portion thereof).

In some exemplary embodiments, for each data slice, a performance measurement of the ANN may be computed. The performance measurement may be F1-Score, Accuracy, or the like. In some exemplary embodiments, the performance measurement may measure the results of applying the ANN on data instances comprised by a data slice. Additionally or alternatively, a performance measurement such as F1-Score, Accuracy, or the like, may be utilized only if the number of data instances comprised by the data slice is above a threshold. The threshold may be 100 data instances, 500 data instances, 1000 data instances, or the like. In response to determining that at least a portion of the performance measurements of the data slices is below a threshold, an action may be performed. In some exemplary embodiments, a performance measurement over a data slice that is below a predetermined threshold may be indicative of a poor performing model, even if the overall results of the performance measurements over another portion of the data slices is above the threshold. The threshold may be an absolute threshold (e.g. 100 data instances, 10 data instances, 5 data instances, 0 data instances) or a relative threshold (e.g. 1% of the overall size of the dataset, 10% of the largest dataset, or the like). In some exemplary embodiments, the performance metric may be indicative to the number of data instances comprising a data slice. A data slice in a size that is below a threshold may be indicative to a poor selection of the architecture of the ANN, indicative to a problem with the dataset, or the like.

In some exemplary embodiments, the data slices may be defined using a combination of attributes from the attribute vector. In some exemplary embodiments, a combination of different attributes (and values thereof) may be used to define different data slices. As an example, there may be four attributes: A, B, C, and D. Data slices may be defined using every n-wise combination of values of the four attributes. For example, every pair of attributes (e.g., A,B; A,C; A,D; B,C; B,D) may be utilized and the different valuations of each such attribute may be used to define a different data slice (e.g., and with respect to the A,B pair, a data slice for instances where A=a1, B=b1, a data slice for instances where A=a1, B=b2, a data slice for instances where A=a2, B=b1 and a data slice for instances where A=a2, B=b2).

In some exemplary embodiments, the action that is performed in response to a performance measurement of a data slice being below a threshold may comprise obtaining a second predictive model. The second predictive model may be a different predictive model than the predictive model, that preforms better than the predictive model for instances in the data slice. In some exemplary embodiments, the second predictive model may be an ANN having a different architecture, such has different number of layers, different number of nodes in a portion of the layers, or the like, may be a predictive model utilizing a different methodology such as decision trees, linear regression, or the like, a manually defined predictive model, or a manual prediction.

Additionally or alternatively, in case two or more predictive models are available, their performance metrics in each different data slice may be compared. Accordingly, when a prediction for an instance is desired, the best-performing predictive model in the relevant data slice may be utilized to provide the prediction. Additionally or alternatively, a combination of the prediction by the two or more predictive models may be utilized, while taking into account their corresponding performance measurements in the relevant data slice when selecting the final prediction based thereon. As an example, the weights given to the different models may be different for different instances, depending on their respective data slices and based on the performance measurement in those data slices.

In some exemplary embodiments, the action may comprise obtaining of another training dataset and training the ANN model based thereon in order to enhance the performance measurement of the ANN. In some exemplary embodiments, training the ANN with another training dataset may improve the predictive model accuracy. In some exemplary embodiments, it may be desired to ensure that the another training dataset comprises training dataset in the respective data slice so as to ensure that the predictive model has the opportunity to improve its prediction ability with respect to the data slice. It is noted that if such training does not improve the performance measurement, this may serve as an indication that the model is unsuitable to handle instances in the data slice. This may be caused due to the architecture of the ANN, due to the nature of the model as an ANN, or due to any other reason.

In some exemplary embodiments, the action may comprise notifying a user that the ANN performance measurement is below the threshold. The notification may be issued by sending an email, by providing a popup message, sending a text message, or the like.

Another technical solution is to automatically map data instances to data slices based on the attribute vector. In some exemplary embodiments, the value of a node in the ANN that is used to define an attribute in the attribute vector may be a non-discrete value. A discrete value may be determined, such as based on absolute values, based on relative values (e.g., percentiles), or the like. In order to determine the data slice of an instances, the values of a portion of the ANN may be computed for the instance. The portion of the ANN may comprise the nodes based on which the attributes are defined, nodes whose value is in a cone of influence to the nodes on which the attributes are defined, or the like.

One technical effect of utilizing the disclosed subject matter is validating a predictive model with respect to data slices, yielding a better validation compared to measuring the performance of the predictive model over the entire training set, testing set, or the like.

Another technical effect of the disclosed subject matter is a white box method for creating data slices based on learned "hidden" features, or the like. In some exemplary embodiments, the data slices may be created based on "hidden" features that may not have a semantic meaning.

Yet another technical effect of the disclosed subject matter is an automated method to define data slices while extracting domain-relevant information from the ANN, and without requiring a human domain-expert to identify the slices. The ANN may learn important features that are relevant to its prediction activity automatically, and these important features are used without requiring a human to even comprehend why they are important. Due to their importance, they may be used to differentiate between data slices in an effective manner.

Yet another technical effect of utilizing the disclosed subject matter is improving the machine learning performance over data slices, by working with multiple machine learning models, differentiated by the value of their hyperparameters. Using the disclosed subject matter, different variants may be recommended for operation, depending on the data slice that an incoming input data record maps to, based on its feature values.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 100, an ANN may be obtained. The ANN may be trained with training data. The ANN may be a Deep Neural Network (DNN), a Convolutional Neural Network (CNN), a Recurrent Neural Network (RNN), or the like. The ANN may comprise several layers. The first layer may be the input layer and the last layer may be the output layer. Additional layers may be comprised between the input layer and the output layer. Such layers may be partly connected layers, fully connected layers, convolutional layers, or the like On Step 110, an attributes vector may be determined based on the ANN. In some exemplary embodiments, the attribute vector may be determined based on a subset of the nodes of the ANN. The subset of the nodes may be used to define the values of the attributes in the attribute vector. For example, a node, such as Node 340a, may receive a non-discrete value (e.g., between 0 and 1). Based on the value of the node, a discrete value of a corresponding attribute may be defined. For example, the range of 0 to 1 may be divided into sub-ranges of 0 to 0.1, 0.1 to 0.5, and 0.5 to 1. Accordingly, the value of the attribute may be either A, B, C, each of which representing a different range. The ranges may be defined using absolute values. Additionally or alternatively, the ranges may be defined using percentiles of the values observed, such as the 25% percentile, the 50% percentile and the 75% percentile may be utilized as the edges of four ranges. Similarly, using the value of Node 340b, a value of a second attribute may be computed.

In some exemplary embodiments, the subset of the nodes may be nodes appearing in a single layer. For example, all or some of the nodes of Layer 340 shown in FIG. 3 may be utilized. The layer that is utilized may be a fully-connected layer. Each node of a fully-connected layer may be calculated based on the value of each node of the preceding layer. A fully-connected layer may be a layer of nodes that each of which is connected to all nodes of the preceding layer. As an example, and referring to ANN 300 illustrated in FIG. 3, Layers 340 and 350 are fully-connected layers. For example, Node 340a is connected to each node of the preceding layer (Layer 330), similarly to each other node of Layer 340. As another example, Node 350a, and each other node of Layer 350, connected to each Node of the preceding layer (Layer 340).

In some exemplary embodiments, the ANN may be a CNN. A CNN may be an ANN that comprises one or more partially connected layers, followed by one or more fully-connected layers. In the CNN the output layer may be defined based on the values of a fully-connected layer. ANN 300 may illustrate an example of a CNN. ANN 300 comprises an Input Layer 310, followed by several partially-connected layers (Layers 320-330), followed by several fully-connected layers (Layers 340, 350) and by an Output Layer 390 that is determined based on the values of a fully-connected layer (Layer 350). In some exemplary embodiments, Layer 330 may be a convolutional layer, in which each sub-portion of the preceding layer (Layer 320) is fed into a respective node (or plurality of nodes). In some exemplary embodiments, CNNs may be characterized in determining local properties using convolutional layers and performing high-level reasoning based on the local properties using the fully-connected layers that follow.

In some exemplary embodiments, the subset of the nodes may comprise nodes of the first fully-connected layer in the CNN (e.g., Layer 340). Additionally or alternatively, the subset of the nodes may comprise nodes of the last layer before the output layer (e.g., Layer 350).

Additionally or alternatively, the subset of the nodes may comprise of nodes in other internal layers, such as Layers 320-350. For example, the subset may comprise Node 340a of Layer 340 and Node 350a of Layer 350.

In some exemplary embodiments, the number of nodes in the subset may be relatively high. In order to reduce the number of attributes, dimensionality reduction may be performed (Step 115). Dimensionality reduction may create a set of variables, whose value is defined based on the values of the subset of nodes but has a smaller size. In some exemplary embodiments, dimensionality reduction may be performed by applying Principle Component Analysis (PCA), by applying an auto-encoder, or the like.

On Step 120, a plurality of data slices may be determined based on the attribute vector. Each data slice may be defined by a set of values of one or more attributes in the attribute vector. Each data slice may correspond to a specific value combination of size t of attributes and may comprise all instances that are mapped to that specific value combination. In some exemplary embodiments, the size t may be provided, such as by a user, determined automatically to limit the number of data slices (e.g., the number of data slices may increase with the increase of t), or the like. Given an instance, the ANN may be applied on the instance (or portion thereof, that includes at least all nodes of the subset of nodes and all nodes that potentially affect their value) to determine the values of the subset of nodes. Based on the values of the subset of nodes, a valuation of the attribute vector may be determined and used to identify the data slice to which the instance is mapped.

On Step 130, testing data may be obtained. The testing data may comprise data items. As an example, the data items may be in a video format, in an audio format, in an image format, in a text format or the like. In some exemplary embodiments, the data may be labeled. Additionally or alternatively, the data may be unlabeled.

On Step 140, for each data slice a performance measurement may be computed. The performance measurement may be F1-Score, Accuracy, or the like. The performance measurement may be indicative of how well the ANN functions when providing a prediction or analyzing an instance that is within the data slice. The ANN may function substantially different with respect to different data slices, such as perform well and provide quality predictions in one slice and perform poorly in another data slice.

Additionally or alternatively, as sparse information may not be used to extract statistically valid claims, in case the number of instances in the testing data that are mapped to the data slice is below a threshold, the performance measurement may be set accordingly. For example, in case there are less than 100 instances that are assigned to the data slice, and although the F1-score may be relatively high, the performance measurement may be set as a low F1-score. Additionally or alternatively, the performance measurement may be set with an invalid value that is indicative of the small size of the data slice in the testing data.

Based on the outcome of the performance measurement, respective actions may be performed. In some exemplary embodiments, in case the performance measurement of a data slice is below a predetermined threshold, or in case the performance measurement is indicative of a small set of instances, an additional dataset may be obtained (Step 150). On Step 155, the additional dataset may be used to re-train the ANN, so as to improve its performance with respect to the data slice. After which, the performance measurement of the ANN with respect to the data slice may be re-evaluated. In some exemplary embodiments, the additional dataset may be a dataset the comprises instances that are mapped to the data slice. Each potential instance may be examined to determine whether it is mapped to the data slice and is to be added to the additional dataset or not. Additionally or alternatively, in case the size of the data slice was below a threshold, the additional dataset may comprise instances in the data slice and may be of a size that is equal to at least the threshold minus the size of the data slice as previously determined. For example, if the threshold is 1000 instances, and previously there were only 900 instances in the testing data that were mapped to the data slice, the additional dataset may be of size 100. The additional dataset may be added to the testing data to allow analysis of the data slice and computation of the performance measurement (Step 140).

It is noted that upon re-training of the ANN, the nodes that were used as a basis for the attribute vector may be modified. The old version of the ANN may be retained and used. In some cases, each node that does not affect the values of the attribute vector may be truncated and removed from the old version of the ANN, to improve performance and avoid unnecessary computations. Additionally or alternatively, Steps 110-120 may be re-performed and a new set of data slices may be determined and utilized. Performance measurement for all new data slices may be calculated and used without retaining any of the information regarding the previously determined data slices.

Additionally or alternatively, instead of re-training and improving the ANN with respect to an under-performing data slice, a second predictive model may be selected to be used for that data slice (Step 160). The second predictive model may be selected for a data slice that has a performance measurement that is below a threshold. Additionally or alternatively, the second predictive model may be selected for the data slice only if the performance measurement of the different predictive model in the data slice is better than that of the ANN. It is noted that the second predictive model may be of any type including a non-ANN model, such as a random forest classifier, Support Machine Vector (SMV), or the like.

As an example, the model may be trained in order to identify cats in pictures. The model may have a performance measurement below a threshold when applied on images of relatively dark background. A second predictive model may be available, which performs better than the model with respect to such images. The second predictive model may be a-priori available, may be defined, such as using a different methodology or different ANN architecture, and trained in retrospect, or the like. An image that is to be classified may be examined to determine whether it is of the relevant data slice (e.g., dark background), and if so the second model may be utilized to classify the image. Otherwise, the original model may be utilized for the classification of the image. It is noted that in the example above, the data slice is defined using a semantically coherent meaning—dark background. However, the data slice may be defined based on properties of the images which are encoded within the nodes of the ANN, and which may not necessarily have any human-understandable meaning.

Additionally or alternatively, on Step 170, an output may be provided to a user. In some exemplary embodiments, the output may indicate to the user that the ANN is under-performing with respect to a specific data slice. The user may, accordingly, attempt to mitigate the situation. In some exemplary embodiments, the output may provide a sample of the instances in the data slice, allowing the user to attempt to comprehend the semantical meaning of the data slice. Additionally or alternatively, visualization of the relevant features, e.g. pixels in the frame that contribute to the fact that the instance is mapped to the data slice may be provided to the user.

Figure 1B:
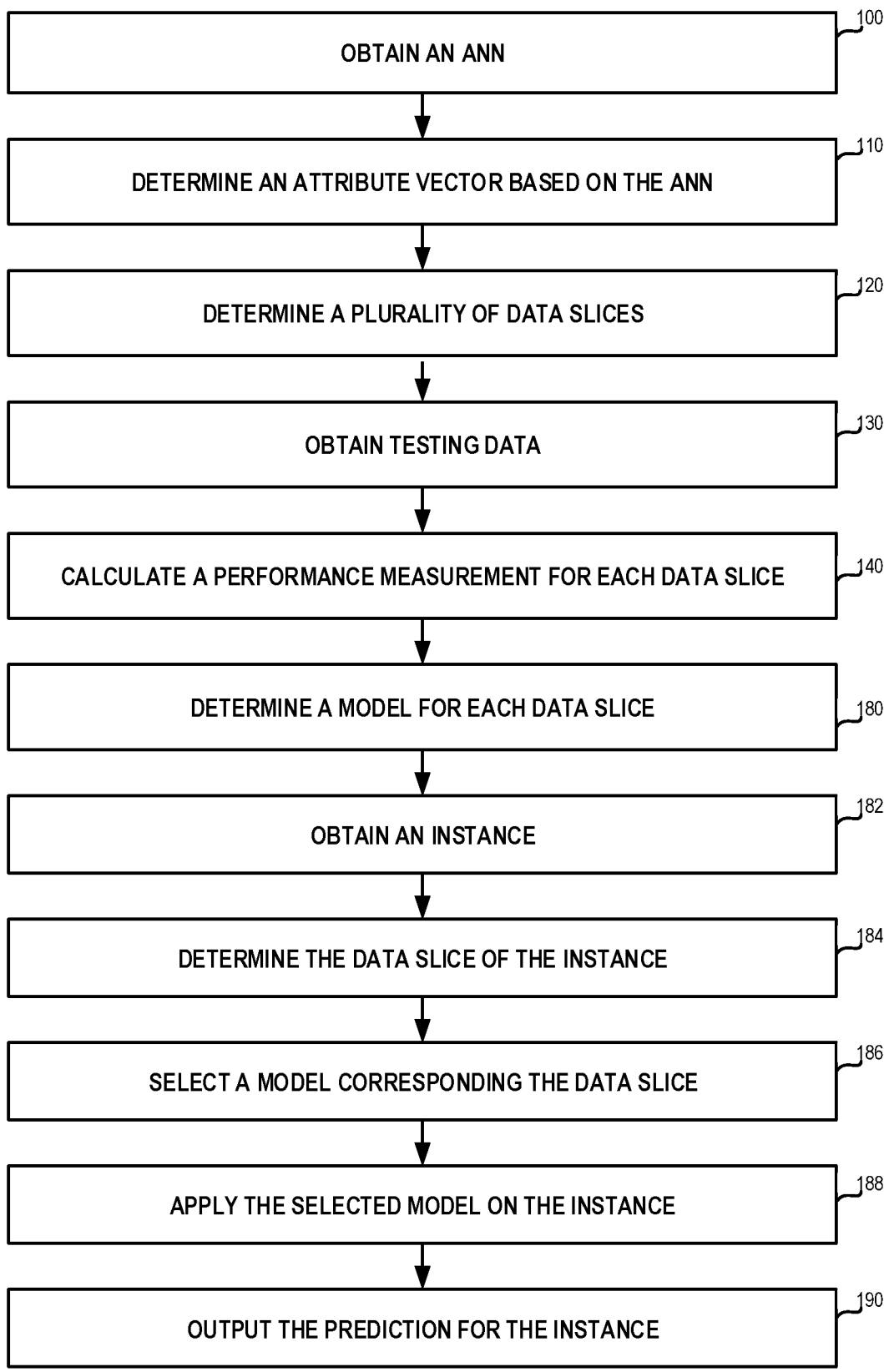
FIG. 1B shows a flowchart diagram of a method, in accordance with some exemplary embodiments of the disclosed subject matter.

Referring now to FIG. 1B showing a flowchart diagram of a method, in accordance with some exemplary embodiments of the disclosed subject matter.

On Step 140, the performance measurement may be calculated for each data slice with respect to a plurality of models. For example, there may be the ANN, another ANN, and a random forest model. The performance measurement of each model on each instance may be calculated. It is noted that the data slices may be determined based on the nodes of only one of the models (e.g., the ANN), based on combination of a portion thereof, or the like.

On Step 180, based on the calculated performance measurement, the best-performing model for each data slice may be determined.

Once an instance is obtained for prediction (182), the relevant data slice of the instance may be identified (184), and a model that corresponds to that data slice, such as determined in Step 180, may be selected (186). On Step 188, the selected model may be applied on the instance to classify or otherwise provide a prediction relating thereto. The prediction may be outputted on Step 190. In some cases, the prediction may be outputted together with an identification of the selected model.

Additionally or alternatively, all models may be applied on the instance. The outputted prediction may be determined based on a confidence measurement of each model and the performance measurement in the data slice. As an example, consider a prediction of an age of a person appearing in an image. If there are three models having accuracy of 90%, 80% and 80%, and providing predictions of ages 20, 50, 25, the outputted age may be a weighted average of the predictions, where the weights are based on the accuracy of the models in the relevant data slice. It is noted that in different data slices, there may be different weights.

Figure 2:
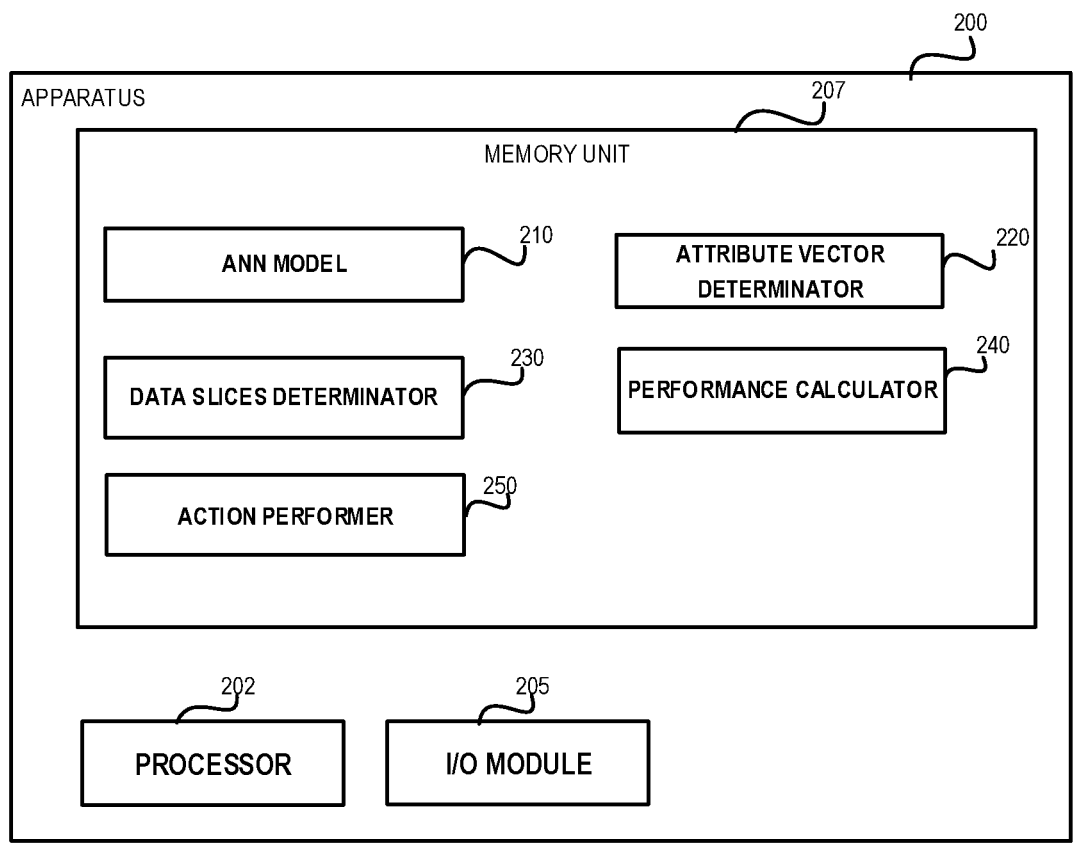
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user, such as, for example providing an output to a user regarding the performances of the ANN over a data slice. In some exemplary embodiments, I/O Module 205 may be configured to obtain an ANN, a second predictive model, datasets, or the like.

In some exemplary embodiments, Apparatus 200 may comprise Memory Unit 207. Memory Unit 207 may be a hard disk drive, a Flash disk, a Random Access Memory (RAM), a memory chip, or the like. In some exemplary embodiments, Memory Unit 207 may retain program code operative to cause Processor 202 to perform acts associated with any of the subcomponents of Apparatus 200. In some exemplary embodiments, Memory Unit 207 may store datasets, measurements performance results, or the like.

Memory 207 may comprise one or more components as detailed below, implemented as executables, libraries, static libraries, functions, or any other executable components.

In some exemplary embodiments, an ANN Model 210 may be configured to predict a label for a data instance. ANN Model 210 may comprise a plurality of layers. Each layer may comprise a set of nodes. In some exemplary embodiments, the nodes may be connected to each other. Additionally or alternatively, ANN Model 210 may comprise a plurality of layers, a plurality of partially connected layers, fully connected layers, or the like. Additionally or alternatively, the ANN Model 210 may be a CNN.

In some exemplary embodiments, an Attribute Vector Determinator 220 may be configured to determine an attribute vector. In some exemplary embodiments, determining the attribute vector may base on at least one layer of ANN Model 210. Additionally or alternatively, the attribute vector may be determined based on a fully connected layer, based on a combination of fully connected layers, based on the first layer in the fully connected layer, or the like. In some exemplary embodiments, Attribute Vector Determinator 220 may obtain a subset of nodes to be used in defining and calculating the values of the attributes in the attribute vector. In some exemplary embodiments, Attribute Vector Determinator 220 may perform a dimension reduction on the subset of nodes. The dimension reduction may be performed by applying PCA on the subset of nodes, by providing the nodes to an auto encoder, or the like.

In some exemplary embodiments, a Data Slices Determinator 230 may be s configured to determine data slices. A data slice may define a subset of data instances that is based on the values of at least some of the attributes in the attribute vector. In some exemplary embodiments, each data slice may be associated with a different valuation of the attribute vector or portion thereof. In some cases, an n-way interaction of attributes may be used to define the data slices. In some exemplary embodiments, data slices may exclude each other (e.g., each instance may be associated with a single data slice). Additionally or alternatively, there may be an overlap between data slices and a single instance may be mapped to several different data slices.

In some exemplary embodiments, a Performance Calculator 240 may be configured to calculate the performance of a predictive model, such as ANN Model 210. In some exemplary embodiments, Performance Calculator 240 may calculate the performance of the model with respect to a data slice. The performance measurement may be, for example, F1-Score, Accuracy, or the like. In case that one performance measurement is below a threshold the model may be deemed as invalid for the respective data slice. Additionally or alternatively, in case the number of instances that are mapped to the data slice is below a threshold, the performance measurement may not be calculated and instead may be set as a low performance measurement, as a minimal performance measurement, as an invalid value indicating the small size of the data slice (e.g., in a measurement that provides only positive values, a negative value indicating the size of the data slice, may be utilized), or the like.

In some exemplary embodiments, data slices having no instances at all matching it, may be considered as empty data slices that cannot be reached. Such may be the case if a data slice combines values of nodes that indicate that the gender of the subject is male and that the subject is pregnant. Although the model may not be valid and is in fact not checked with respect to the empty data slice, the performance measurement of the empty data slice may be set above the threshold, or otherwise, the disclosed subject matter may avoid requiring modifications regarding the empty data slice.

In some exemplary embodiments, an Action Performer 250 may be configured to perform an action. Performing the action may be in response to determining that the performance measurement is below a threshold for a data slice. The action may comprise obtaining an additional instances that match the data slice and retraining ANN Model 210 with the additional instances.

Additionally or alternatively, Action Performer 250 may be configured to set a selected model for each data slice. In some exemplary embodiments, Performance Calculator 240 may be invoked to calculate the performance measurement of ANN Model 210 and of a second model, for each data slice. Action Performer 250 may be configured to select a best-performing model to be used for each data slice. Additionally or alternatively, Action Performer 250 may be configured to set weights to combine predictions of the different models, where the weights may be different in different data slices and determined based on the performance measurements of the models in the different data slices. Additionally or alternatively, Action Performer 250 may be configured to interfere with the utilization of ANN Model 210 only in data slices where the performance measurement is below a threshold. Hence, in a data slice where ANN Model 210 performs adequately, another model that has a better performance measurement may not be used.

Additionally or alternatively, Action Performer 250 may be configured to provide an output to a user.

Figure 3:
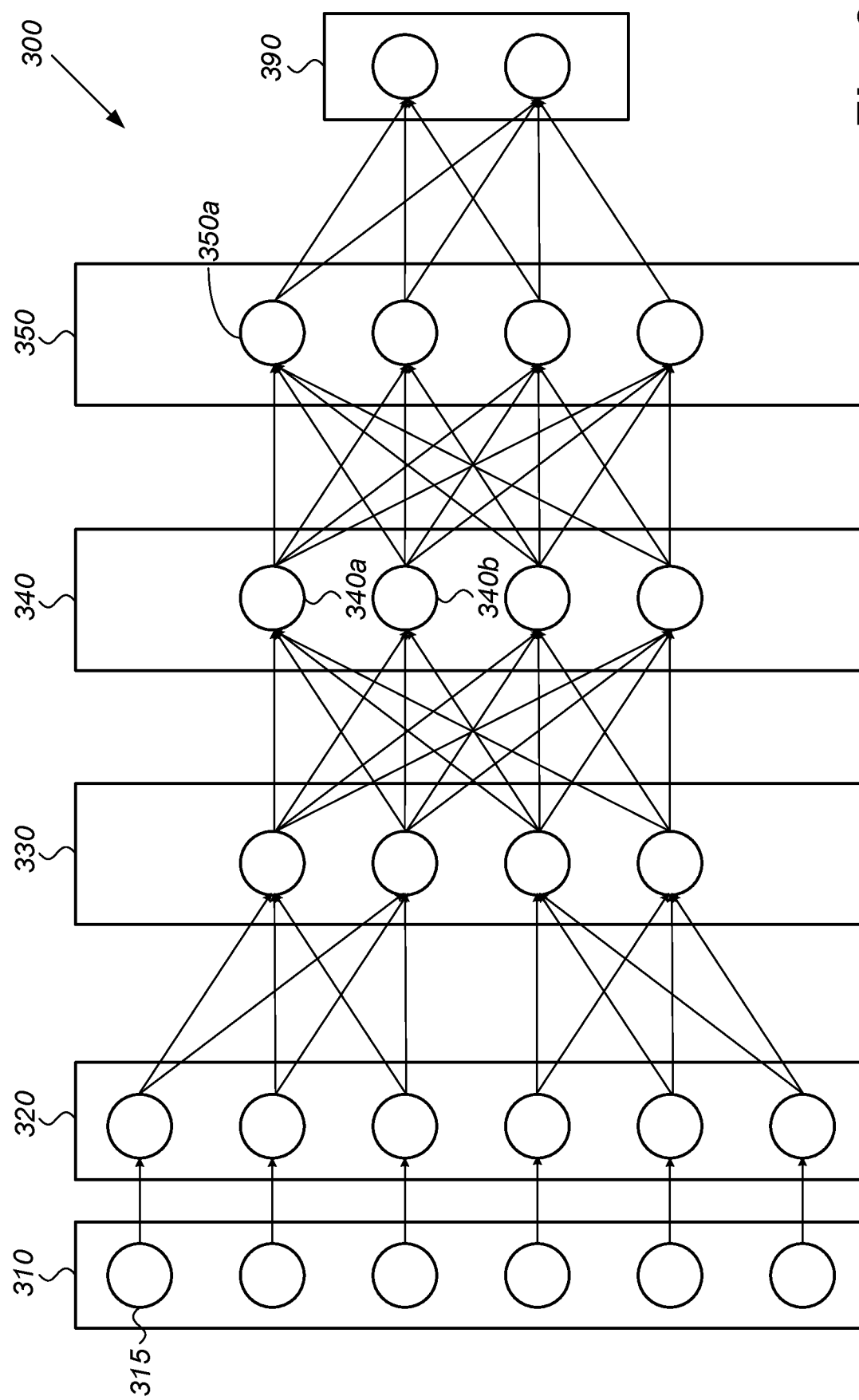
FIG. 3 shows a schematic illustration of an exemplary ANN in which the disclosed subject matter may be utilized, in accordance with some exemplary embodiments of the disclosed subject matter.

Referring now to FIG. 3 showing a schematic illustration of an exemplary ANN in accordance with some exemplary embodiments of the disclosed subject matter.

ANN 300 may be a predicative mode comprising Input Layer 310, Layers 320, 330, Fully Connected Layers 340, 350 and Output Layer 390.

Input Layer 310 may be a data instance when divided into features such as feature 315.

Layer 320 may be a partly connected layer as the nodes in it are not connected to all the nodes in the preceding layer, Layer 310. In some exemplary embodiments, there may be a plurality of partly connected layers. In some exemplary embodiments, Layer 320 may be a convolutional layer and may represent local properties of the data.

As can be appreciated, Layers 330, 340, 350 have less nodes then the Input Layer 310 and Layer 320.

Layer 340 may be the first fully connected layer in ANN 300, as each node in Layer 340 is connected to all the nodes in the preceding layer, Layer 330.

In some exemplary embodiments, an attribute vector may be determined based on ANN 300. The attribute vector may comprise attributes whose value is defined by Node 340*a*, Node 340*b*, Layer 340, Node 350, or the like.

It is noted that ANN 300 is provided for illustrative purposes only. There may be additional layers in ANN 300. For example, there may be additional partially connected layers before Layer 340, and additional fully-connected layers after Layer 340. Additional layers may also be introduced elsewhere.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining an Artificial Neural Network (ANN), wherein the ANN is configured to provide a prediction for a data instance, wherein the ANN comprises a set of nodes having interconnections therebetween;
   determining an attribute vector based on a subset of the nodes of the ANN;
   determining, based on the attribute vector, a plurality of data slices;
   obtaining a testing dataset comprising testing data instances;
   computing, for each data slice, a performance measurement of the ANN over the data slice, wherein said computing is based on an application of the ANN on each testing data instance that is mapped to the data slice; and
   performing an action based on at least a portion of the performance measurements of the data slices.

2. The method of claim 1, wherein the performance measurement of a data slice is indicative whether a number of the testing data instances that are mapped to the data slice is below a threshold.

3. The method of claim 1, wherein the ANN comprises a plurality of layers, wherein each layer comprises a set of nodes, wherein the attribute vector is based on a layer of the ANN.

4. The method of claim 3, wherein the layer is a fully-connected layer.

5. The method of claim 3, wherein the attribute vector is based on the layer and based on a second layer of the ANN.

6. The method of claim 1, wherein the ANN is a Convolutional Neural Network (CNN), wherein the CNN comprises a set of partly-connected layers followed by a set of fully-connected layers, wherein the attribute vector is determined based on a fully-connected layer of the set of fully-connected layers.

7. The method of claim 6, wherein the fully-connected layer is a layer that is connected to a partly connected layer of the set of partly-connected layers.

8. The method of claim 1, wherein said determining the attribute vector comprises:
   obtaining the subset of the nodes; and
   performing dimensionality reduction to determine the attribute vector.

9. The method of claim 1, wherein said performing the action comprises:
   in response to determining that the performance measurement of a data slice is below a threshold, obtaining an additional dataset;
   retraining the ANN with the additional dataset.

10. The method of claim 1, wherein said performing the action comprises:
    selecting a selected model for a data slice, wherein said selecting is performed between the ANN and a second predictive model, wherein said selecting is based on a comparison between the performance measurement of the ANN for the data slice and a performance measurement of the second predictive model for the data slice;
    obtaining an instance for prediction;
    determining that the instance is mapped to the data slice, wherein said determining is based on a valuation of the attribute vector for the instance; and
    applying the selected model to provide a prediction for the instance.

11. The method of claim 1, wherein said performing the action comprises providing an output to a user.

12. The method of claim 1, wherein determining a valuation of the attribute vector comprises determining a discrete value for an attribute based on a non-discrete value of a node in the subset of nodes of the ANN.

13. A computer program product comprising a non-transitory computer readable storage medium retaining program instructions, which program instructions when read by a processor, cause the processor to perform a method comprising:
 obtaining an Artificial Neural Network (ANN), wherein the ANN is configured to provide a prediction for a data instance, wherein the ANN comprises a set of nodes having interconnections therebetween;
 determining an attribute vector based on a subset of the nodes of the ANN;
 determining, based on the attribute vector, a plurality of data slices;
 obtaining a testing dataset comprising testing data instances;
 computing, for each data slice, a performance measurement of the ANN over the data slice, wherein said computing is based on an application of the ANN on each testing data instance that is mapped to the data slice; and
 performing an action based on at least a portion of the performance measurements of the data slices.

14. The computer program product of claim 13, wherein the performance measurement of a data slice is indicative whether a number of the testing data instances that are mapped to the data slice is below a threshold.

15. The computer program product of claim 13, wherein the ANN comprises a plurality of layers, wherein each layer comprises a set of nodes, wherein the attribute vector is based on a layer of the ANN.

16. The computer program product of claim 13, wherein the ANN is a Convolutional Neural Network (CNN), wherein the CNN comprises a set of partly-connected layers followed by a set of fully-connected layers, wherein the attribute vector is determined based on a fully-connected layer of the set of fully-connected layers.

17. The computer program product of claim 13, wherein said determining the attribute vector comprises:
 obtaining the subset of the nodes; and
 performing dimensionality reduction to determine the attribute vector.

18. The computer program product of claim 13, wherein said performing the action comprises:
 in response to determining that the performance measurement of a data slice is below a threshold, obtaining an additional dataset;
 retraining the ANN with the additional dataset.

19. The computer program product of claim 13, wherein said performing the action comprises:
 selecting a selected model for a data slice, wherein said selecting is performed between the ANN and a second predictive model, wherein said selecting is based on a comparison between the performance measurement of the ANN for the data slice and a performance measurement of the second predictive model for the data slice;
 obtaining an instance for prediction;
 determining that the instance is mapped to the data slice, wherein said determining is based on a valuation of the attribute vector for the instance; and
 applying the selected model to provide a prediction for the instance.

20. A computerized apparatus having a processor and coupled memory, the processor being adapted to perform the steps of:
 obtaining an Artificial Neural Network (ANN), wherein the ANN is configured to provide a prediction for a data instance, wherein the ANN comprises a set of nodes having interconnections therebetween;
 determining an attribute vector based on a subset of the nodes of the ANN;
 determining, based on the attribute vector, a plurality of data slices;
 obtaining a testing dataset comprising testing data instances;
 computing, for each data slice, a performance measurement of the ANN over the data slice, wherein said computing is based on an application of the ANN on each testing data instance that is mapped to the data slice; and
performing an action based on at least a portion of the performance measurements of the data slices.

* * * * *